United States Patent
Kamimura et al.

(10) Patent No.: US 7,839,433 B2
(45) Date of Patent: Nov. 23, 2010

(54) IMAGING APPARATUS

(75) Inventors: Junji Kamimura, Yokohama (JP);
Akihito Nishizawa, Yokosuka (JP);
Yuichi Nonaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 823 days.

(21) Appl. No.: 11/622,041

(22) Filed: Jan. 11, 2007

(65) Prior Publication Data

US 2007/0263108 A1 Nov. 15, 2007

(30) Foreign Application Priority Data

Jan. 13, 2006 (JP) .............. 2006-005484

(51) Int. Cl.
*H04N 5/228* (2006.01)
*H04N 5/235* (2006.01)
*G03B 17/00* (2006.01)

(52) U.S. Cl. ................ 348/208.6; 348/362; 396/55

(58) Field of Classification Search ........... 348/208.4, 348/208.6, 208.1, 196, 208.5, 208.11, 208.8, 348/208.12, 208.13, 362
See application file for complete search history.

(56) References Cited

U.S. PATENT DOCUMENTS

| | | | |
|---|---|---|---|
| 5,060,074 A * | 10/1991 | Kinugasa et al. ........ 348/208.6 |
| 6,778,210 B1 | 8/2004 | Sugahara et al. |
| 7,340,160 B2 * | 3/2008 | Kamimura et al. ........... 396/52 |
| 7,352,390 B2 * | 4/2008 | Gonzalez ................ 348/208.6 |
| 7,424,213 B2 * | 9/2008 | Imada ....................... 396/55 |
| 2004/0160525 A1 * | 8/2004 | Kingetsu et al. .......... 348/364 |

FOREIGN PATENT DOCUMENTS

| | | |
|---|---|---|
| JP | 05-191709 | 7/1993 |
| JP | 2001-86398 | 3/2001 |
| JP | 2002-287197 | 10/2002 |
| JP | 2002-287198 | 10/2002 |
| JP | 2003-021854 | 1/2003 |
| JP | 2004-279514 | 10/2004 |
| JP | 2005-198148 | 7/2005 |

* cited by examiner

*Primary Examiner*—David L Ometz
*Assistant Examiner*—Ahmed A Berhan
(74) *Attorney, Agent, or Firm*—Antonelli, Terry, Stout & Kraus, LLP.

(57) ABSTRACT

An imaging apparatus which can correct a shaking of the hand whether a moving picture is taken or a still picture is taken. Exposure is carried out within a shorter time than a predetermined exposure time to output a charge. Exposure and delivery of charge is carried out plural times to accumulate charges. An address for accumulation is changed in accordance with information of a shaking occurring within the shorter time and a signal due to the shaking and a signal before the shaking are accumulated at the address. Alternatively, a camera-shake is detected by using a sensor such as a gyroscope adapted to detect an angular velocity or an acceleration of a shaking of the imaging apparatus itself.

8 Claims, 5 Drawing Sheets

IMAGING APPARATUS

INCORPORATION BY REFERENCE

The present application claims priority from Japanese application JP2006-005484 filed on Jan. 13, 2006, the content of which is hereby incorporated by reference into this application.

BACKGROUND OF THE INVENTION

The present invention relates to an imaging apparatus and an imaging device.

As a background art in the technical field concerned, JP-A-2003-21854, for example, is available. The patent document states that "PROBLEM TO BE SOLVED: To obtain the positional change of an image according to output from an imaging device in the midst of exposure and to correct image blur based on the positional change whether a moving picture is taken or a still picture is taken."

And, it also states that "SOLUTION: This camera has an optical path control means capable of moving the image on an image formation surface and the imaging device capable of performing non-destructive read, and records output from the imaging device as image data, and it has a control means for correcting the image blur by obtaining output from the imaging device several times in the midst of exposure so as to find the positional change of the image, and controlling the optical path control means so as to restrain the positional change."

SUMMARY OF THE INVENTION

Conventionally, the imaging apparatus having the shake correction function conducts the camera-shake detection on the basis of an image signal outputted from the imaging device whether a moving picture is taken or a still picture is taken and an optics lens is moved mechanically in accordance with detection results to form an image on a light receiving surface, thus realizing the shake correction.

This type of conventional apparatus, however, needs a means for moving the optics lens mechanically and its scale is increased when considered as a system. In addition, because of the fact that the shake detection is carried out on the basis of the image signal delivered out of the imaging device, discrimination between a movement due to an object per se and a movement caused by shaking of the hand cannot be made without difficulties, raising a problem that accurate shake correction can hardly be achieved.

Accordingly, the increased system scale of the imaging apparatus which conducts the shake correction irrespective of the moving picture taking mode or the still picture taking mode accounts for a first problem to be solved. Also, the shake detection based on an image signal delivered out of the imaging device and facing difficulties in distinctively recognizing a movement due to shaking of the hand accounts for a second problem to be solved.

The present invention starts from the aforementioned problems and its object is to improve the easy-to-handle capability of the imaging apparatus and imaging device.

To accomplish the above object, according to a representative aspect of the present invention, an imaging apparatus using a two-dimensional solid imaging device of changeable exposure time in which a plurality of photoelectric conversion elements or pixels are arrayed in horizontal and vertical directions to perform photoelectric conversion in accordance with an image formed on a light receiving surface of photoelectric conversion element by the action of a lens, comprises a module which accumulates an output charge of each of the photoelectric conversion elements in a unit of pixel at a designated address, a module which completes a photoelectric conversion within a time shorter than a predetermined exposure time to output charges plural times, and a module which changes the address to be designated to the accumulation module in such a manner that a camera-shake generated within the shorter time can be restrained.

According to this invention, the easy-to-handle capability of the imaging apparatus and imaging device can be promoted.

BRIEF DESCRIPTION OF THE DRAWINGS

These and other features, objects and advantages of the present invention will become more apparent from the following description when taken in conjunction with the accompanying drawings wherein.

DESCRIPTION OF THE EMBODIMENTS

Embodiments of the present invention will be described hereunder.

Embodiment 1

Referring first to FIGS. 1 to 4, a first embodiment of the invention will be described.

Figure 1:
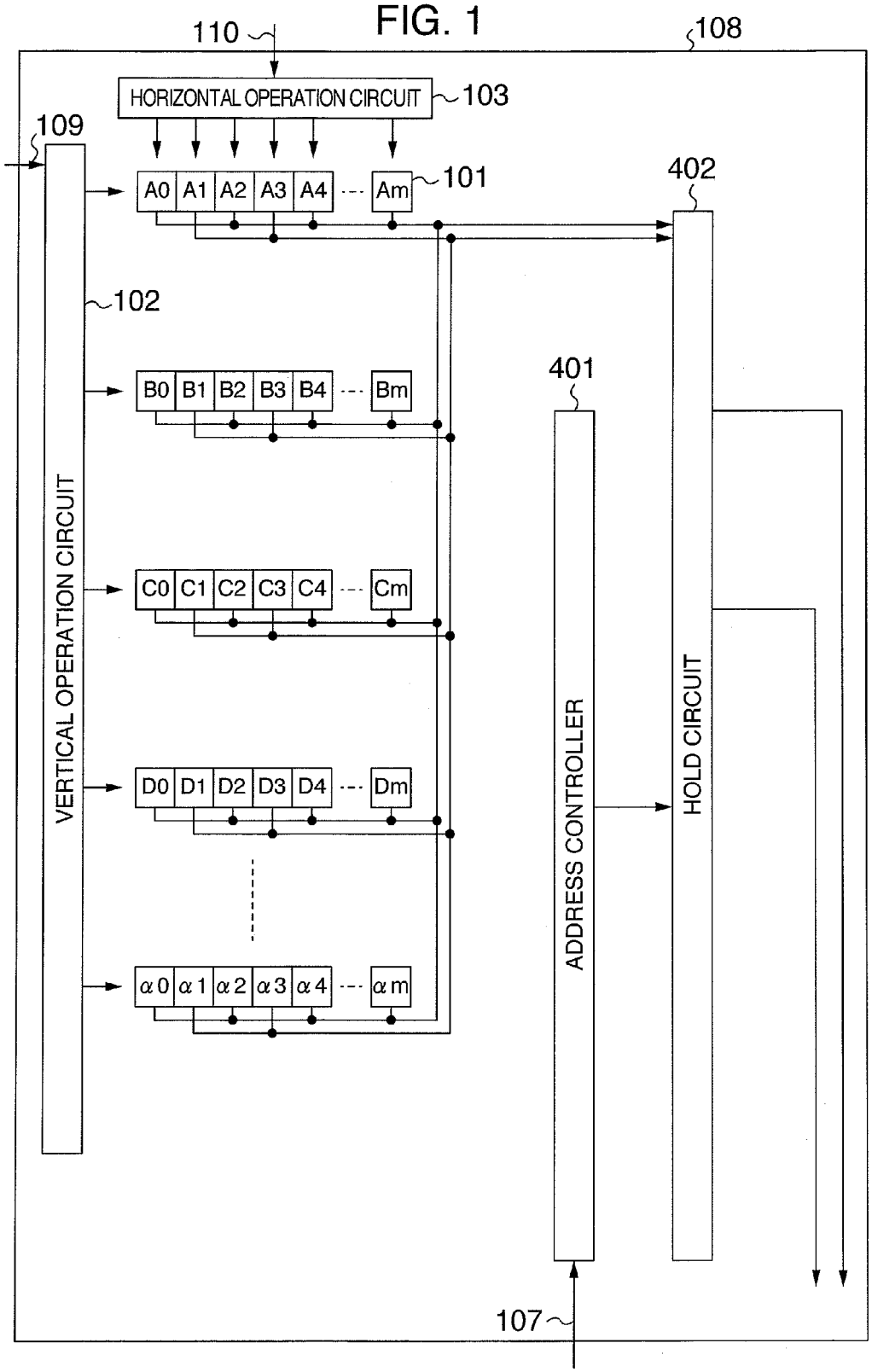
FIG. 1 is a block diagram of an imaging apparatus according to a first embodiment of the present invention.

An imaging apparatus designated at reference numeral 108 in FIG. 1 comprises an array of photoelectric conversion elements 101, a vertical operation (scan) circuit 102 for selecting read lines arrayed in the vertical direction in the photoelectric conversion elements 101, a horizontal operation (scan) circuit 103 for selecting read pixels or photoelectric conversion elements arrayed in the horizontal direction of the photoelectric conversion elements 101, a hold circuit 402 for holding outputs of the photoelectric conversion elements 101 by a predetermined number of pixels at designated addresses, and an address controller 401 for controlling the address of the hold circuit 402. The vertical operation circuit 102 is responsive to a control signal 109 and the horizontal operation circuit 103 is responsive to a control signal 110.

The control signals 109 and 110 connect to inputs of the vertical and horizontal operation circuits 102 and 103, respectively, the photoelectric conversion elements 101 include m photoelectric conversion elements (pixels) in the horizontal direction and α photoelectric conversion elements (pixels) in the vertical direction arranged in a two-dimensional array, outputs of each of the vertical and horizontal operation circuits 102 and 103 are used to read corresponding photoelectric conversion elements 101, respectively, an output of a photoelectric conversion element of the photoelectric conversion elements 101 connects to an input of the hold circuit 402 through a bus, and a control signal 107 connects to an input of the address controller 401 having its output connected to another input of the hold circuit 402.

Figure 2:
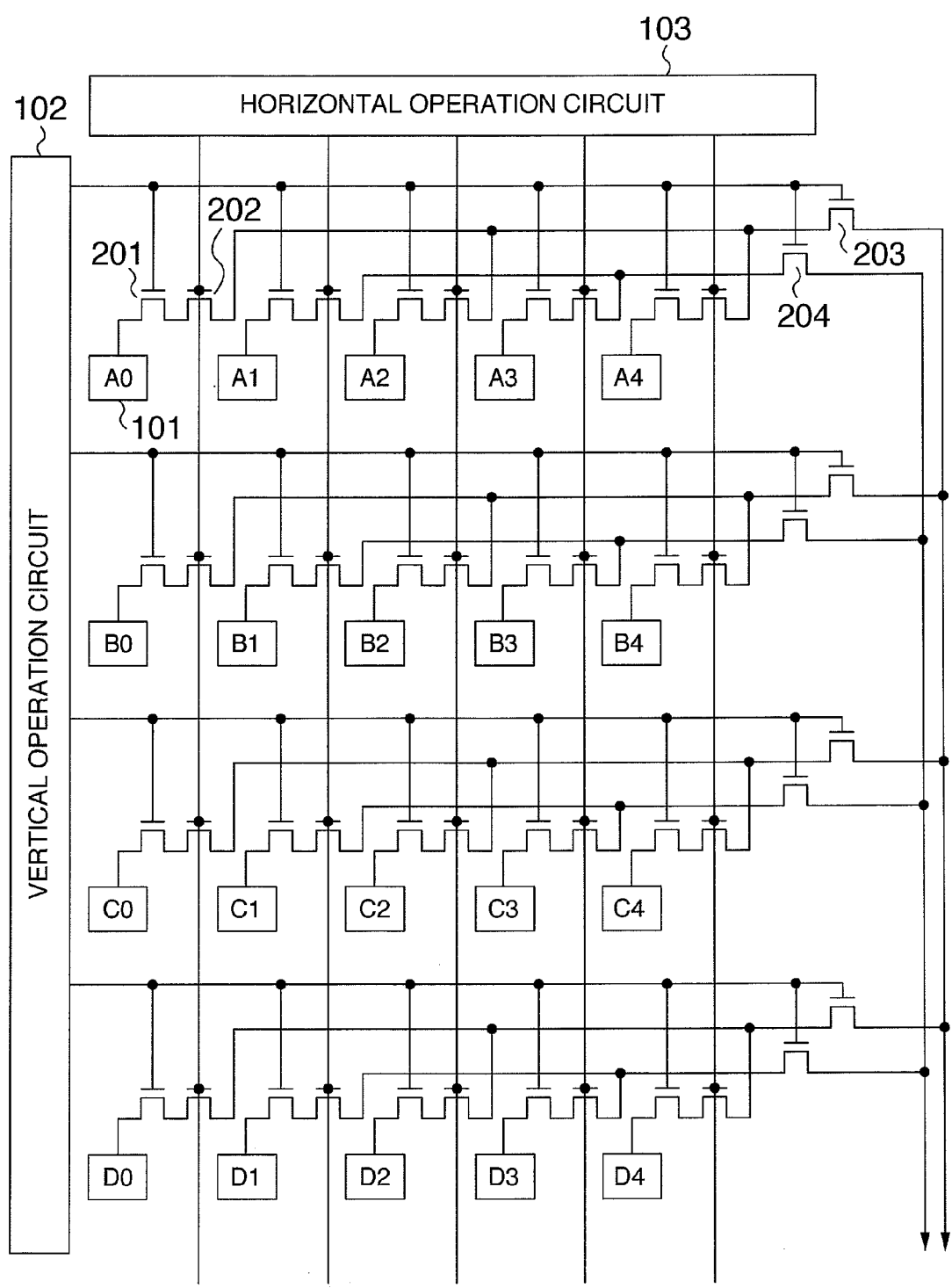
FIG. 2 is a circuit diagram showing details of an imaging device in the first embodiment.

Turning to FIG. 2, the imaging device includes vertical read gates 201, horizontal read gates 202, read line selection gates 203 and read line selection gates 204. The vertical read gate 201 is connected to the output of each of the photoelectric conversion elements 101 and the horizontal read gate 202 is connected to the output of vertical read gate 201. The number of the vertical read gates 201 equals the number of the photoelectric conversion elements and the horizontal read gates 202 are also equal in number to the photoelectric conversion elements. In the horizontal direction, outputs of odd numbered horizontal read gates 202 are connected to the read line selection gate 203 and outputs of even numbered horizontal read gates 202 are connected to the read line selection gate 204. The number of read line selection gates 203 and the number of read line selection gates 204 each equal the number of the lines arrayed in the vertical direction. Outputs of the respective line selection gates 203 are connected in common to an identical bus and outputs of the respective selection gates 204 are also connected in common to an identical bus, the two data busses being involved structurally.

Figure 3:
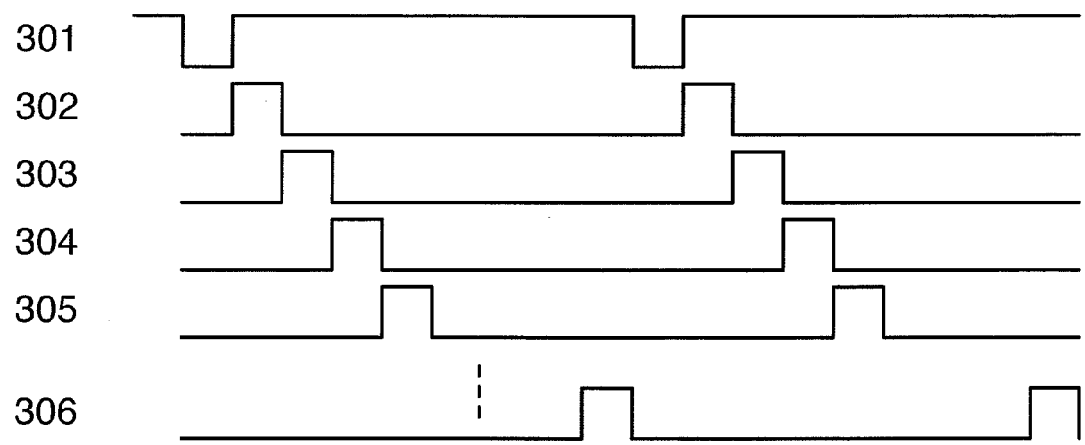
FIG. 3 is a waveform diagram useful in explaining a vertical direction drive method in the imaging device in the first embodiment.
Figure 4:
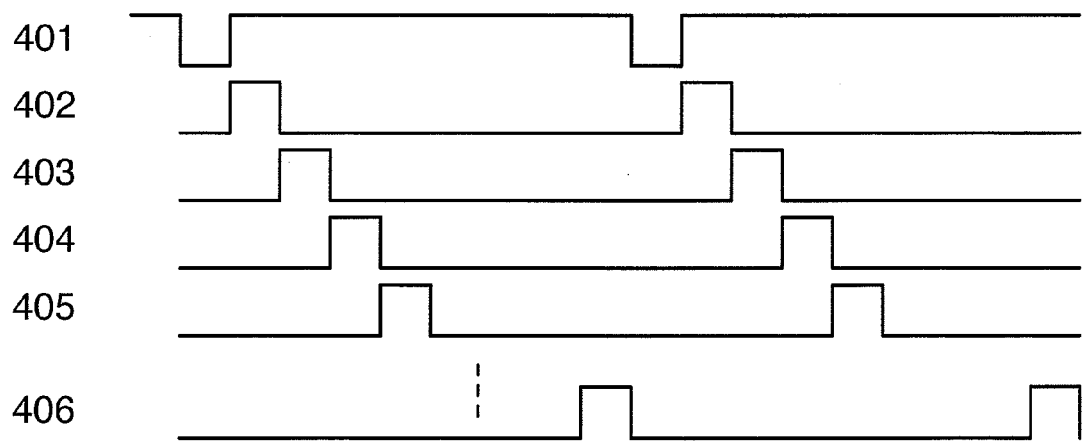
FIG. 4 is a waveform diagram useful in explaining a horizontal direction drive method in the imaging device in the first embodiment.

In FIG. 3, a waveform diagram depicts a vertical synchronizing signal 301 and vertical read signals 302 to 306 outputted from the vertical scan circuit 102 so as to be supplied to the respective vertical read gates 201. Depicted in FIG. 4 is a waveform diagram depicting a horizontal synchronizing signal 401 and horizontal read signals 402 to 406 outputted from the horizontal scan circuit 103 so as to be supplied to the respective horizontal read gates 202.

For convenience of explanation, an example of taking a still picture by using an imaging element of CMOS type which is driven in a progressive fashion to output a monochromatic signal will be described below.

In operation, the vertical scan circuit 102 responds to the control signal 109 to deliver vertical read signals 302 to 306 for designating respective lines on which signals are read out of the photoelectric conversion elements (pixels) 101 arrayed two-dimensionally. For example, the vertical read signal 302 opens the vertical read gates 201 connected to photoelectric conversion elements arrayed horizontally on a line (row) starting from an element A0 as shown in FIG. 2. The horizontal scan circuit 103, on the other hand, responds to the control signal 110 to deliver horizontal read signals 402 to 406 for designating respective horizontal positions (columns) on which signals are read out of photoelectric conversion elements (pixels) 101 arrayed two-dimensionally. For example, the horizontal read signal 402 opens the horizontal read gates 202 connected to photoelectric conversion elements 101 arrayed vertically on a column starting from the element A0 as shown in FIG. 2. Accordingly, a charge of an photoelectric conversion element on a row selected by the vertical read signal 302 and also on a column selected by the horizontal read signal 402 is read, so that when the vertical scan circuit 102 has selected all rows and the horizontal scan circuit 103 has selected all columns, readout of charges of all photoelectric conversion elements 101 is completed. The individual readout charges are inputted to the hold circuit 402 through the read line selection gates 203 and 204. In this phase, only a line or row undergoing readout by the read line selection gates 203 and 204 is selected. The address controller 401 responds to a control signal 107 to determine which one of addresses a presently read horizontally n-th pixel on the line is to be held at and inputs the determined address to the hold circuit 402. The hold circuit 402 adapted to hold input data at a designated address continues holding data read out within a predetermined time at the designated address. Thus, when different data is again held at the address in use, the sum of the precedently held data and the data held succeedingly at present is held. At the expiration of the predetermined time, data finally held is outputted.

How the address controller 401 and hold circuit 402 operate will now be described in greater detail.

Reading of the photoelectric conversion element of photoelectric conversion elements 101 is executed plural times within an exposure time shorter than a predetermined exposure time. In the event that a shaking or shakings of the hand are generated within the shorter exposure time, the address controller 401 receives the control signal 107 generated for the purpose of straining blur to decide how much a charge to be inputted to the hold circuit 402 needs to be shifted in the horizontal and vertical directions and delivers an address at which data read out at present is held. The hold circuit 402 holds the received charge in order at the designated address.

Through the above operation, the shaking is detected and the signal inputted to a means adapted to hold readout signals is shifted in accordance with pieces of shaking information delivered within the shorter time than the predetermined exposure time, so that even when the shaking occurs and an image to be formed on the light receiving surface of the imaging device moves in the vertical and horizontal directions, a video corrected for the shaking can be obtained. Then, the scale of a system for realizing this achievement can be small and the imaging apparatus per se can be reduced in size. Structurally, the hold circuit 402 is disposed internally of the imaging apparatus 108 but it may obviously be arranged externally of the imaging apparatus 108. For convenience of explanation, the foregoing description has been given of the example of taking a still picture by using the imaging device which delivers a monochromatic signal in the progressive drive fashion but obviously, even in the case of an interlace drive or of the use of an imaging device having a color filter arranged, teachings of the present invention can fulfill itself by changing the drive method. It will be appreciated that the control signal 107 can alternatively be generated by a means adapted to detect a positional shift of the apparatus such as a gyroscope.

Embodiment 2

Referring now to FIGS. 3 to 6, a second embodiment of the invention will be described.

Figure 5:
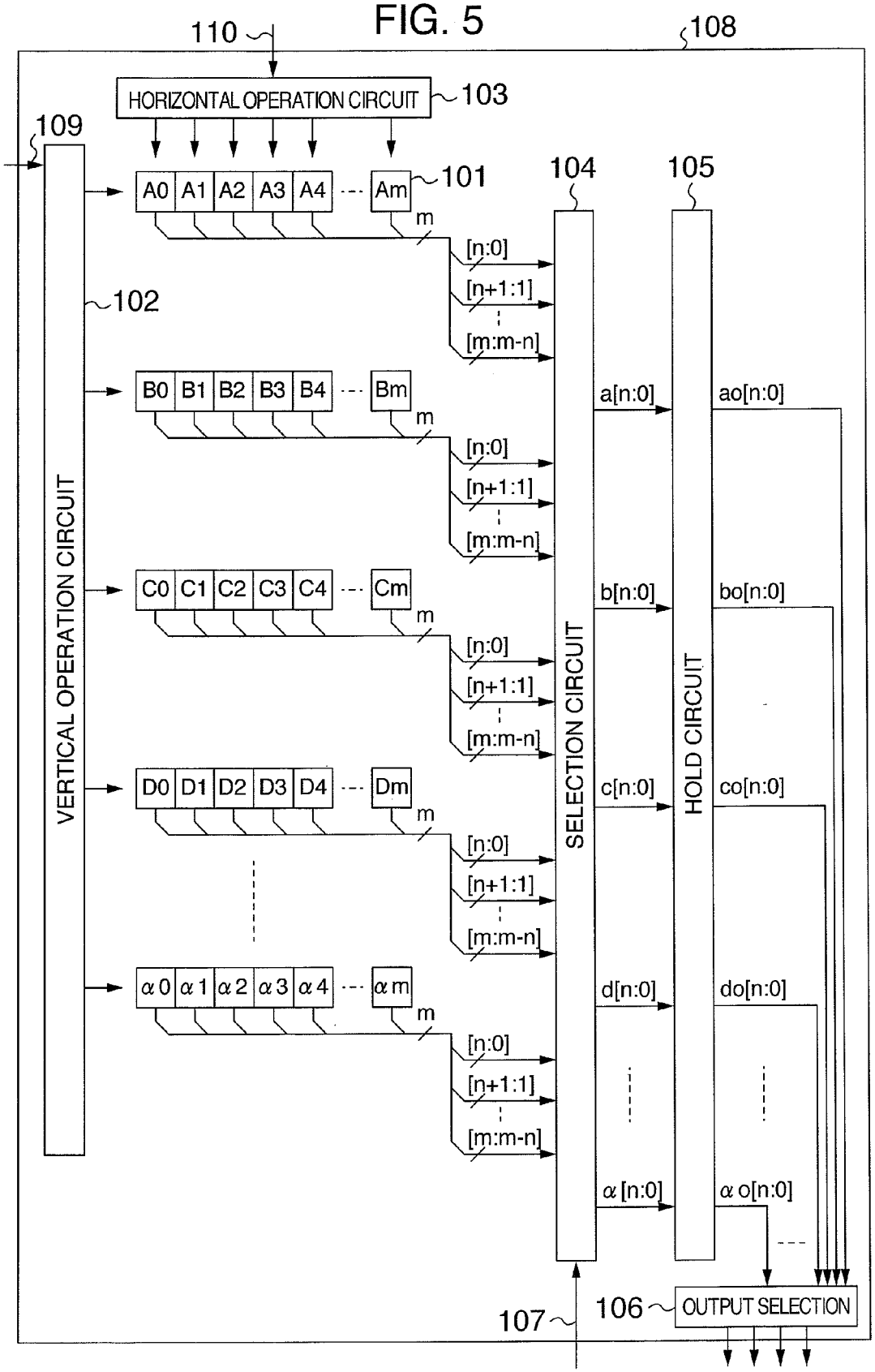
FIG. 5 is a block diagram of an imaging apparatus according to a second embodiment of the invention.

An imaging apparatus designated at reference numeral 108 in FIG. 5 comprises an array of photoelectric conversion elements 101, a vertical operation (scan) circuit 102 for selecting read lines arrayed in the vertical direction in the photoelectric conversion elements 101, a horizontal operation (scan) circuit 103 for selecting read pixels or photoelectric conversion elements arrayed in the horizontal direction of the photoelectric conversion elements 101, a selection circuit 104 for selecting an output from many outputs of the photoelectric conversion elements 101 in accordance with a predetermined rule, a hold circuit 105 for holding outputs of the selection circuit 104 by a predetermined number of pixels, an output selection circuit 106 for delivering outputs of the hold circuit 105 to its plural output terminals in accordance with a predetermined rule, and a control signal 107 for controlling the selection circuit 104.

The photoelectric conversion elements 101 include m photoelectric conversion elements (pixels) in the horizontal direction and α photoelectric conversion elements (pixels) in the vertical direction arranged in a two-dimensional array, outputs of each of the vertical and horizontal operation circuits 102 and 103 are used to read corresponding photoelectric conversion elements 101, respectively, many outputs of the photoelectric conversion elements 101 connect to inputs of the selection circuit 104, the control signal 107 connects to another input of the selection circuit 104, outputs of the selection circuit 104 connect to inputs of the hold circuit 105, outputs of the hold circuit 105 connect to inputs of the output selection circuit 106 and outputs of the output selection circuit 106 connect to output terminals.

Figure 6:
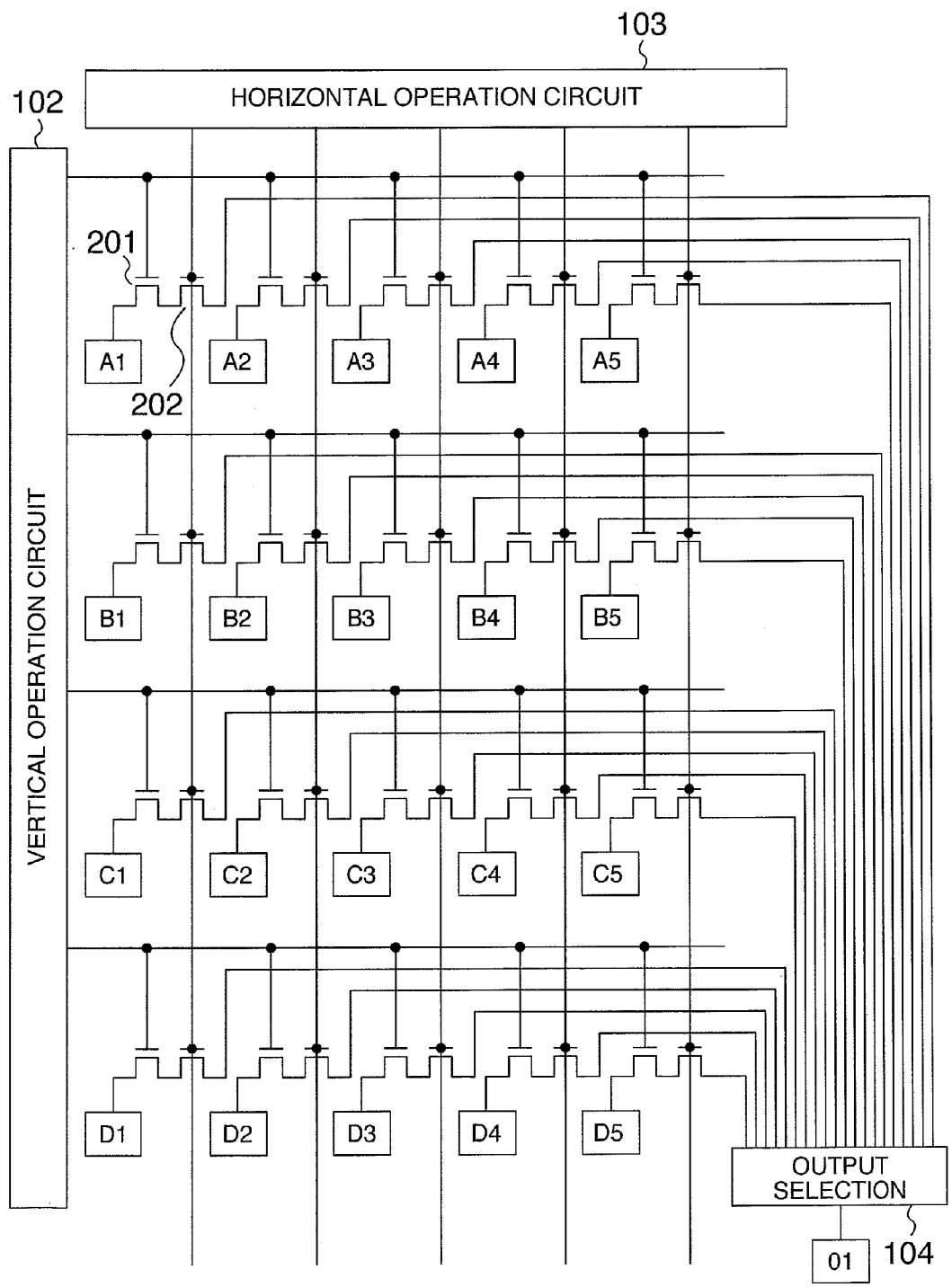
FIG. 6 is a circuit diagram showing details of an imaging device in the second embodiment.

Turning to FIG. 6, the imaging apparatus includes vertical read gates 201 and horizontal read gates 202. The vertical read gate 201 is connected to the output of each of the photoelectric conversion elements 101 and the horizontal read gate 202 is connected to the output of vertical read gate 201. The number of the vertical read gates 201 equals the number of the photoelectric conversion elements 101 and the horizontal read gates 202 are also equal in number to the photoelectric conversion elements 101. The output of horizontal read gate 202 connects to the input of selection circuit 104, the output of selection circuit 104 connects to the input of hold circuit 105, each output of the vertical operation circuit 102 connects to corresponding vertical read gates 201 and each output of the horizontal operation circuit 103 connects to corresponding horizontal read gates 202.

As described previously, illustrated in FIG. 3 are a vertical synchronizing signal 301 and vertical read signals 302 to 306 outputted from the vertical scan circuit 102 so as to be supplied to the respective vertical read gates 201 and illustrated in FIG. 4 are a horizontal synchronizing signal 401 and horizontal read signals 402 to 406 outputted from the horizontal scan circuit 103 so as to be supplied to the respective horizontal gates 202.

For convenience of explanation, an example of taking a still picture by using an imaging element of CMOS type which is driven in a progressive fashion to output a monochromatic signal will be described below.

In operation, the vertical scan circuit 102 delivers vertical read signals 302 to 306 for designating lines on which signals are read out of the photoelectric conversion elements (pixels) 101 arranged in two-dimensional array. For example, the vertical read signal 302 opens the vertical read gates 201 connected to photoelectric conversion elements 101 arrayed horizontally on a line (row) starting from an element A1 as shown in FIG. 2. The horizontal scan circuit 103, on the other hand, delivers horizontal read signals 402 to 406 for designating horizontal positions (columns) on which signals are read out of the photoelectric conversion elements (pixels) 101 arranged two-dimensionally. For example, the horizontal read signal 402 opens the horizontal read gates 202 connected to photoelectric conversion elements 101 arrayed vertically on a column starting from the element A1 as shown in FIG. 2. Accordingly, a charge of an photoelectric conversion element on a row selected by the vertical read signal 302 and also on a column selected by the horizontal read signal 402 is read, so that when the vertical scan circuit 102 has selected all rows and the horizontal scan circuit 103 has selected all columns, readout of charges of all photoelectric conversion elements 101 is completed. Out of all the individual readout charges, the ones are selected by means of the selection circuit 104 responsive to the control signal 107 in accordance with the predetermined rule and held in the hold circuit 105. The held charges are distributed by means of the output selection circuit 106 in accordance with the number of its output terminals. For example, when the number of output terminals is four, charges on even numbered columns and odd numbered columns on one row can be outputted to different output terminals to ensure that charges on two lines or rows can be read simultaneously. Through the above operation, all of the photoelectric conversion elements 101 can be read.

How the selection circuit 104 and hold circuit 105 operate will now be described in greater detail.

Reading of the photoelectric conversion elements 101 is executed plural times within an exposure time shorter than a predetermined exposure time. In the event that a shaking or shakings of the hand are generated within the shorter exposure time, the selection circuit 104 receives the control signal 107 generated for the purpose of restraining blur to decide how much a charge to be inputted to the hold circuit 105 needs to be shifted in the horizontal and vertical directions and delivers a charge at a desired position. The hold circuit 105 holds the received charge in order.

Through the above operation, the shaking is detected and the signal inputted to a means adapted to hold readout signals is shifted in accordance with pieces of shaking information delivered within the shorter time than the predetermined exposure time, so that even when the shaking occurs and an image to be formed on the light receiving surface of the imaging device moves in the vertical and horizontal directions, a video corrected for the shaking can be obtained. Then, the scale of a system for realizing this achievement can be small and the imaging apparatus per se can be reduced in size. Structurally, the hold circuit 105 is disposed internally of the imaging apparatus 108 but it may obviously be arranged externally of the imaging apparatus 108. For convenience of explanation, the foregoing description has been given of the example of taking a still picture by using the imaging device which delivers a monochromatic signal in the progressive drive fashion but obviously, even in the case of an interlace drive or of the use of an imaging device having a color filter arranged, teachings of the present invention can fulfill itself by changing the drive method.

In another possible embodiment, an imaging apparatus using a two-dimensional solid imaging device of changeable exposure time in which a plurality of photoelectric conversion elements are arrayed in horizontal and vertical directions to perform photoelectric conversion in accordance with an image formed on a light receiving surface of photoelectric conversion element by the action of a lens, comprises a module which accumulates an output charge of each of the photoelectric conversion elements in a unit of pixel at a designated address, a module which completes a photoelectric conversion within a time shorter than a predetermined exposure time to output charges plural times, and a module which changes the address to be designated to the accumulation module such that a camera-shake generated within the shorter time can be restrained.

In still another possible embodiment, an imaging apparatus using a two-dimensional solid imaging device of changeable exposure time in which a plurality of photoelectric conversion elements are arrayed in horizontal and vertical directions to perform photoelectric conversion in accordance with an image formed on a light receiving surface of photoelectric conversion element by the action of a lens, comprises a module which accumulates an output charge of each of the photoelectric conversion elements in a unit of pixel, a module which completes a photoelectric conversion within a time shorter than a predetermined exposure time to output charges plural times, and a module which shifts, responsive to outputting of each charge, the input to the accumulation module in a unit of pixel such that a camera-shake generated within the shorter time can be restrained.

In yet another possible embodiment, an imaging device of changeable exposure time comprises a module which accumulates output charges of photoelectric conversion elements in a unit of pixel, and a control module which controls inputting of a charge delivered out of the photoelectric conversion element within an exposure time shorter than a predetermined exposure time to the accumulation module such that a camera-shake can be restrained.

In yet another possible embodiment, an imaging device of changeable exposure time comprises a module which accumulates output charges of photoelectric conversion elements in a unit of pixel, and an input module which adjusts a charge delivered out of the photoelectric conversion element within an exposure time shorter than a predetermined exposure time such that a camera-shake can be restrained and inputs it to the accumulation module.

In a still further possible embodiment, the imaging apparatus or imaging device according to the above embodiments, the accumulation module may arranged internally of the imaging apparatus.

In a still further possible embodiment, the imaging apparatus or imaging device according to the above embodiments, the imaging device may use a photoelectric converter in which signals are read independently in a unit of photoelectric conversion element or pixel.

In a still further possible embodiment, an imaging apparatus using an imaging device having a photoelectric converter in which signals from photoelectric conversion elements are read independently, comprises a hold module which holds signals from the photoelectric conversion elements, and a selection module which selects which part of the hold module a signal obtained from a photoelectric conversion element within a shorter exposure time than a predetermined exposure time is held at.

In a still further possible embodiment, the imaging apparatus or imaging device according the embodiments above further comprises a detection module which detects a positional shift of the imaging apparatus and the selection module selects, on the basis of detection by the detection module, which part of the hold module a signal from a photoelectric conversion element is held at.

In a still further possible embodiment, the imaging apparatus or imaging device according to the above embodiments, the hold module may be arranged internally of the imaging apparatus.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications that fall within the ambit of the appended claims.

The invention claimed is:

1. An imaging apparatus using a two-dimensional solid imaging device of changeable exposure time in which a plurality of photoelectric conversion elements or pixels are arrayed in horizontal and vertical directions to perform photoelectric conversion in accordance with an image formed on a light receiving surface of photoelectric conversion element by the action of a lens, comprising:
    an accumulation module which accumulates an output charge of each of the photoelectric conversion elements in a unit of pixel at a designated address;
    a charge output module which outputs charges plural times by completing a photoelectric conversion within a time shorter than a predetermined exposure time;
    an address change module which changes the address to be designated to said accumulation module such that a camera-shake generated within the shorter time can be restrained; and
    a module which generates one sheet (piece) of image by using charges that are outputted from the charge output module plural times and are accumulated in the accumulation module, while the address is being changed by the address change module.

2. The imaging apparatus according to claim 1, wherein said imaging apparatus is an imaging apparatus for picking up a motion picture,
    said charge output module outputs charges plural times at shorter time than a frame rate of the motion picture, and said image generation module generates one frame of the motion picture by using charges that are outputted plural times at shorter time than the frame rate of the motion picture.

3. The imaging apparatus according to claim 1, wherein said accumulation module is a memory arranged internally of said two-dimensional solid imaging device, and said address change module changes the address to be designated to the memory.

4. The imaging apparatus according to claim 2, wherein said accumulation module is a memory arranged internally of said two-dimensional solid imaging device, and
    said address change module changes the address to be designated to the memory.

5. An imaging apparatus using a two-dimensional solid imaging device of changeable exposure time in which a plurality of photoelectric conversion elements are arrayed in horizontal and vertical directions to perform photoelectric conversion in accordance with an image formed on a light receiving surface of photoelectric conversion element by the action of a lens, comprising:
    an accumulation module which accumulates an output charge of each of the photoelectric conversion elements in a unit of pixel;
    a charge output module which outputs charges plural times by completing a photoelectric conversion within a time shorter than a predetermined exposure time;
    an input shift module which shifts the input to said accumulation module in a unit of pixel so that a camera-shake generated within the shorter time can be restrained; and
    a module which generates one sheet (piece) of image by using charges that are outputted from the charge output module plural times and accumulated in said accumulation module which the input to the accumulation module is shifted in a unit of pixel by the input shift module.

6. The imaging apparatus according to claim 5, wherein said imaging apparatus is an imaging apparatus for picking up a motion picture,
    said charge output module outputs charges plural times at shorter time than a frame rate of the motion picture, and said image generation module generates one frame of the motion picture by using charges that are outputted plural times at shorter time than the frame rate of the motion picture.

7. The imaging apparatus according to claim 5, wherein said accumulation module is a memory arranged internally of said two-dimensional solid imaging device, and said address change module changes the address to be designated to the memory.

8. The imaging apparatus according to claim 5, wherein said accumulation module is a memory arranged internally of said two-dimensional solid imaging device, and
    said address change module changes the address to be designated to the memory.

* * * * *